US005552102A

United States Patent [19]

Kragle et al.

[11] Patent Number: 5,552,102

[45] Date of Patent: Sep. 3, 1996

[54] METHOD AND APPARATUS FOR EXTRUDING LARGE HONEYCOMBS

[75] Inventors: Harry A. Kragle; David W. Lambert, both of Corning; G. Daniel Lipp, Painted Post, all of N.Y.

[73] Assignee: Corning Incorporated, Corning, N.Y.

[21] Appl. No.: 358,099

[22] Filed: Dec. 16, 1994

[51] Int. Cl.[6] .................. B29C 47/12

[52] U.S. Cl. .................. 264/177.11; 264/177.12; 264/211.11; 425/198; 425/380; 425/463; 425/467

[58] Field of Search .................. 264/177.12, 177.11, 264/211.11; 425/461, 463, 464, 467, 382 R, 197–199, 380

[56] References Cited

U.S. PATENT DOCUMENTS

| | | | |
|---|---|---|---|
| 1,849,431 | 3/1932 | Mayhew . | |
| 3,112,184 | 11/1963 | Hollenbach . | |
| 3,559,252 | 2/1971 | Schmidt et al. . | |
| 3,790,654 | 2/1974 | Bagley . | |
| 3,911,070 | 10/1975 | Lundsager | 264/44 |
| 3,986,816 | 10/1976 | Gwinn et al. | 425/467 |
| 4,108,590 | 8/1978 | Kontz | 264/209.1 |
| 4,343,604 | 8/1982 | Minjolle . | |
| 4,396,572 | 8/1983 | Batigne et al. | 264/209.1 |
| 4,409,284 | 10/1983 | Sugino et al. . | |
| 4,465,652 | 8/1984 | Lentz | 425/464 |
| 4,629,593 | 12/1986 | Groh et al. | 264/209.1 |
| 5,188,779 | 2/1993 | Horikawa et al. | 264/62 |
| 5,403,787 | 4/1995 | Day | 501/7 |

FOREIGN PATENT DOCUMENTS

| | | | |
|---|---|---|---|
| 64-22504 | 1/1989 | Japan | 264/177.12 |
| 64-61202 | 3/1989 | Japan | 264/211.11 |
| 4-86204 | 3/1992 | Japan | 264/211.11 |

*Primary Examiner*—Jeffery R. Thurlow
*Attorney, Agent, or Firm*—Kees van der Sterre

[57] ABSTRACT

Extrusion die apparatus and an extrusion method for extruding large-cross-section honeycomb structures from plasticized ceramic batch materials are described, the apparatus comprising a die having a support rod connected to its central portion, the support rod being anchored to support means upstream of the die. The support rod and support means act to limit die distortion during extrusion, reducing die strain and stress to levels permitting large honeycomb extrusion without die failure. Dies of optimal thickness are disclosed which reduce the maximum stresses exerted on the die during extrusion.

14 Claims, 2 Drawing Sheets

METHOD AND APPARATUS FOR EXTRUDING LARGE HONEYCOMBS

BACKGROUND OF THE INVENTION

The Government of the United States of America has rights in this invention pursuant to Contract No. DEN3-336 awarded by the Department of Energy.

The present invention relates to the manufacture of large honeycomb structures and more particularly to a method and apparatus for extruding large honeycomb structures having a high cell count and thin cell walls, for applications such as heat regenerator wheels in turbine engines.

The use of ceramic honeycomb structures for heat regenerator wheels in gas turbine engines is well known. U.S. Pat. No. 3,112,184 to Hollenbeck, for example, describes what is known as the lay-up method for manufacturing honeycomb structures for heat regenerator applications. In that method, supporting sheets of a fibrous material such as paper are impregnated with ceramic precursor materials and thereafter shaped into corrugated configuration. The corrugated sheets are then combined with similarly impregnated flat sheets to form corrugated bilayers and the bilayers are wrapped into a large wheel of corrugated honeycomb configuration.

The lay-up technique can provide ceramic honeycombs with high cell density and thin cell walls. However, the method is both time consuming and expensive, and thus not well suited for the mass production of thin-walled high-cell-density honeycomb structures.

Ceramic honeycombs have also been made by less expensive extrusion methods, such as disclosed in U.S. Pat. No. 3,790,654 to bagley. In accordance with those methods, plasticized ceramic batch materials are extruded through a honeycomb extrusion die to produce honeycombs for applications such as supports for automotive emissions control catalysts.

The die assemblies used in these extrusion methods include a steel die or die body in the form of a plate, the plate being provided on the upstream or inlet face with an array of machined feedholes and on the downstream or outlet face with an array of crisscrossing discharge slots. The feedholes intersect the discharge slots, supplying batch material thereto which is then shaped during discharge into the crisscrossing or intersecting walls of the desired honeycomb structure.

Extrusion methods are faster and less expensive than lay-up methods, but to date have not been developed to the point where large honeycombs of high cell count and thin cell walls can be made. At present, large honeycomb structures, that is structures over about 15 cm (6 inches) in diameter, are made with relatively heavy extrusion die assemblies and with relatively low cell counts. Typical cell counts in such structures are below 62 cells/cm$^2$ (400 cells/in$^2$), with cell walls being on the order of 178 μm(0.007 inches) in thickness.

For the successful extrusion of structures of this size and cell density, heavy honeycomb extrusion dies made from steel plates having thicknesses on the order of 5 cm (2 inches) or more have been used. Despite the added die thickness, some distortion of the die is still possible because the longer extrusion paths through the die increase extrusion back pressure, so that higher extruder ram pressures are required to successfully force the batch through the dies. This difficulty is increased as finer discharge slot and feedhole structures, such as would be required for thin-walled, high cell count honeycombs, are attempted.

For use in a heat regenerator environment, large (>15 cm diameter) ceramic structures having cell counts on the order of at least 800 cells/in$^2$ with cell walls below 0.007 inches in thickness will be required. If extruded, these honeycomb designs will require extrusion dies with very large numbers of very fine feedholes, in order to supply adequate batch material to the high cell count discharge slot array. The use of thick dies for these extrusions will not be practical due to drilling limitations, and materials for thin die plates of the necessary strength and stiffness are not yet available.

It is a principal object of the present invention to develop an extrusion method for making a high-cell-count heat regenerator wheel or core at low cost and in high volume, yet which would offer good thermal durability and high strength for use in turbine engine environments.

It is a further object of the invention to provide extrusion die apparatus suitable for the extrusion of large honeycomb structures having thin cell walls and high cell counts.

SUMMARY OF THE INVENTION

For the purpose of manufacturing high-cell-count heat exchanger structures, the present invention utilizes a relatively thin steel plate to form the die, but provides supplemental support means for die reinforcement. The approach taken is to utilize a center rod support or pull rod, passing through the die and anchored to a support behind or upstream of the die, to prevent plate failure and restrict plate distortion under the pressure of extrusion. This approach permits the extrusion of a relatively large honeycomb structure with thin walls and a high cell count using a much thinner die than would otherwise be possible. And, due in part to the relatively low thickness of the die and resulting shortness of the feedholes, lower extrusion pressures than previously thought possible can be used.

Accordingly, in a first aspect, the present invention comprises die apparatus for the extrusion of a honeycomb structure which comprises an extrusion die, typically in the form of a plate, having an inlet face provided with a multiplicity of feedholes for the input of batch material from an upstream direction and an outlet face provided with a multiplicity of discharge slots for the discharge of the batch material as a honeycomb in a downstream direction. Included in the apparatus is at least one support rod, connected to the die and extending in the upstream direction from the die inlet face. The upstream-extending end of the support rod is connected to anchoring support means, spaced upstream from the die. The support rod and support means act to inhibit movement (reduce stress and strain) on the extrusion die during the extrusion of batch material through the die.

In a second aspect the invention comprises a method for extruding a honeycomb body of large diameter and high cell count which comprises extruding a batch material from a honeycomb extrusion die of large diameter and high cell count in a downstream direction while applying a supporting force to the die in an upstream direction. In accordance with the invention, the supporting force is supplied to central portions of extrusion die by at least one support member or rod connected to the central portion(s) and attached to support means positioned in the upstream direction from the die.

A honeycomb structure produced by the above method will have a structure which reflects the presence of the support rod during extrusion. Typically, that structure consists of a central opening in the face of the honeycomb formed by and corresponding to the regions of the die inlet or outlet face blocked by the support rod. For applications such as rotary heat regenerators, however, such a central opening is advantageous in that it provides a convenient location for a hub member to facilitate regenerator rotation, as is customary to achieve heat recuperation in a turbine engine environment.

Through mathematical analyses of extrusion die apparatus operating as above described, preferred families of dies have been identified in which minimum die stresses at preselected extrusion pressure levels can be achieved. These families do not comprise the thickest dies, but instead comprise dies in a range of thicknesses below those previously considered appropriate for the production of large honeycomb structures by extrusion. Surprisingly, increases in die thickness from that range, as well as decreases, have been found to generate higher stresses and strains on critical regions of the die outlet face where the largest extrusion stresses are generated.

BRIEF DESCRIPTION OF THE DRAWINGS

The invention may be further understood by reference to the drawings, wherein.

DETAILED DESCRIPTION

In the die apparatus of the invention, the support rod is typically connected to the die more or less centrally of the inlet face thereof. Simple attachment may be by means of an opening provided in the die through which the support rod extends, with fastening to the die being made by bolting, pinning, or any other means. Other attachment options could be used depending on the extrusion pressures anticipated, including options such as welding or cementing the support rod to the inlet face.

The thickness of the support rod, while not critical, is important since thicker rods are more effective in reducing die strain than thinner rods. Ideally the rod will support extrusion stresses with little or no elongation or yield. The cross-sectional configuration of the rod, whether round, square, or other shape, may be varied depending on factors such as the method to be used to attach the rod to the die and to the upstream support for the rod.

The upstream support for the rod may comprise one or more bridging or support members attached to the barrel of the extruder, or attached to a die enclosure or cartridge connected to the extruder. Die enclosures or cartridges are conventional structures for mounting dies to the barrels of extruders, and provide a good base for the ultimate support of the die, support rod, and supporting structure for the rod.

One convenient means of support for the rod is a baffle plate or other thick ported plate anchored to the extruder or die enclosure upstream of the die. A baffle plate, which typically consists simply of a thick metal plate provided with holes through which the batch material is forced during the process of extrusion, can be as thick as desired without interfering with extrusion, and thus can provide a relatively rigid base for a support rod at almost any extrusion pressure to be employed.

The relative spacing of the support and die can be important if the support is a baffle plate. In that case, the support rod should be sufficiently long, i.e., the die-support spacing sufficiently large, that any disturbance in batch flow caused by the plate does not disturb the configuration of the extruded honeycomb.

Figure 1:
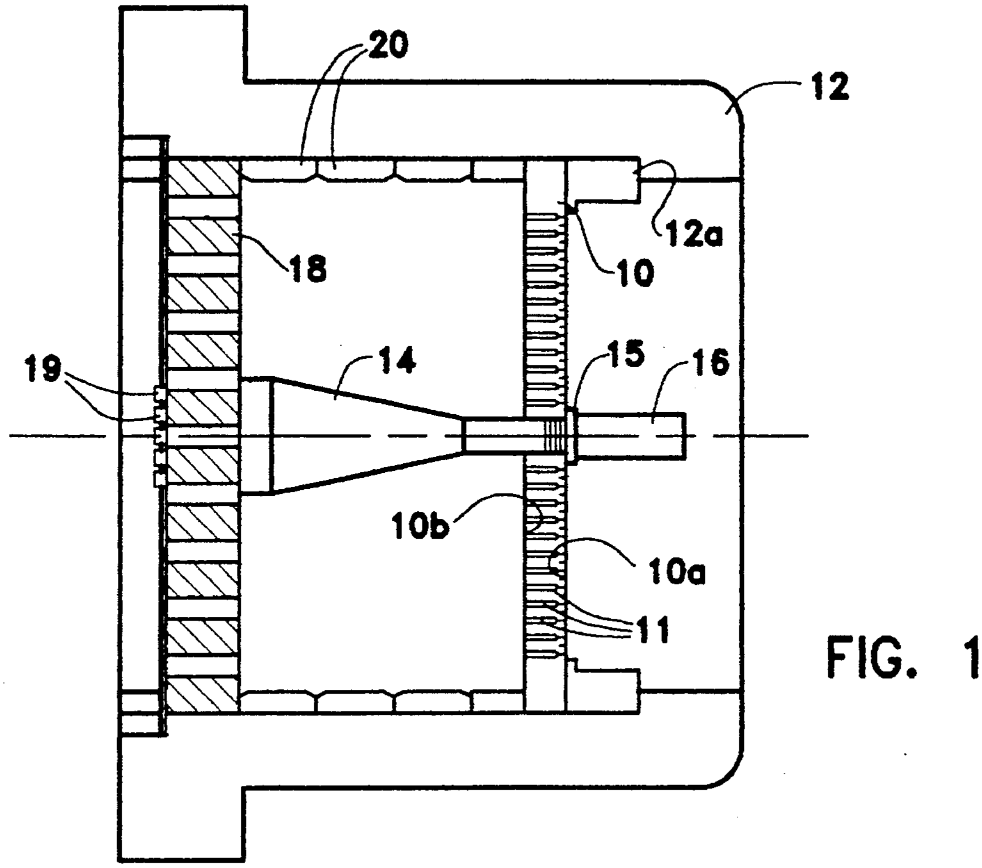
FIG. 1 is a schematic side elevational view in partial cross-section of extrusion die apparatus in accordance with the invention.
Figure 2:
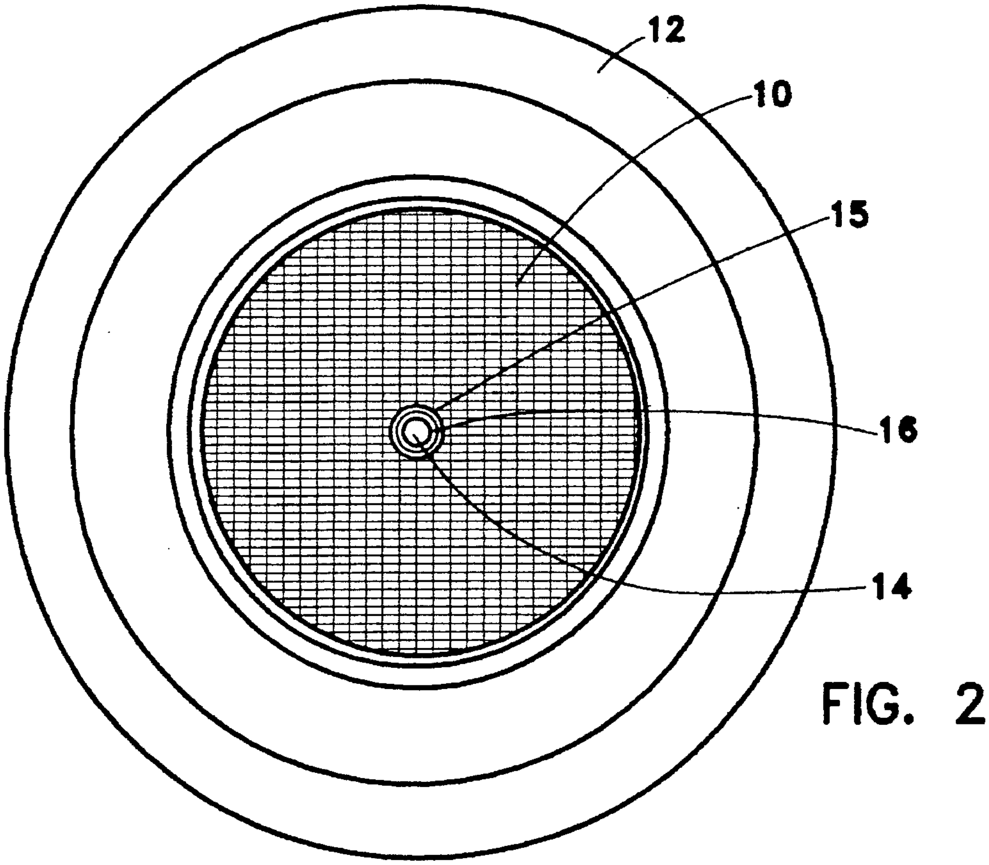
FIG. 2 is a schematic end view of the extrusion die apparatus of FIG. 1.

A schematic illustration of a preferred die apparatus design for honeycomb extrusion in accordance with the invention is provided in FIGS. 1 and 2 of the drawing. As shown in those figures, a die 10 is disposed in a die enclosure or cartridge 12 such that outlet face **10*a* of the die faces outwardly from the cartridge. Die 10 includes discharge slots and feedholes 11, the discharge slots being formed in outlet face 10*a* and the feedholes connecting with those slots being formed in a die inlet face 10*b*. Thus batch material in the cartridge can be extruded through die 10 and discharged from outlet face 10*a*** as a honeycomb in the conventional fashion.

Attached to die 10 and extending from inlet face **10*b* thereof is support rod 14. Rod 14 is attached to the die by means of a washer 15 and nut 16. The nut is threaded onto one end of rod 14 which extends through a central opening in die 10**.

The opposite end of support rod 14 is attached to baffle plate 18, attachment being by means of cap screws 19 which extend through plate 18 to thread into the base end of support rod 14. Baffle plate 18 is edge-supported at the back of cartridge 12 by spacers 20 (and thus ultimately by lip or mask **12*a* on the die cartridge), but is thicker than die 10 and thus sufficiently stiff and strong to provide substantially immovable support means for anchoring support rod 14 and die 10** during batch extrusion.

While FIGS. 1 and 2 illustrate a preferred die design utilizing only a single support rod, it will be recognized that other designs employing multiple support rods can alternatively be used, where products with multiple openings in the honeycomb structure may be desired.

For applications such as inorganic or ceramic honeycomb extrusion a useful die design criterion is to select components and component assemblies capable of operating at extrusion pressures on the order of 1,000–2,000 psi without exceeding the yield stress of any component. Materials capable of providing this level of performance have previously been identified, and include as preferred materials the high strength stainless steels. These may comprise ferritic, austenitic, martensitic or precipitation-hardenable types of stainless steels, to be selected based on strength and elastic modulus as required for the component being specified. In general, steel materials having yield strengths of at least 50,000 psi and elastic moduli of at least 28×106 psi will be used.

An important tool for validating designs intended to operate at these extrusion pressures is finite element analysis, which analyzes a mathematical die model based on the physical properties and dimensions of steel die components to be used. Applying such an analysis to a model of a die such as above described, comprising a die, a baffle plate, a support rod connecting the die and baffle plate, and a rigid surrounding support structure for the assembly, such an analysis can provide accurate predictions of the stresses to be expected at each point in the assembly while in use.

From a stress management standpoint the regions of primary concern in extrusion die assemblies are those regions under the highest tensional stress. Most critical of these are surface regions on the outlet face of the die covering those sections of the die plate experiencing the maximum deflection under extrusion loads.

Figure 3:
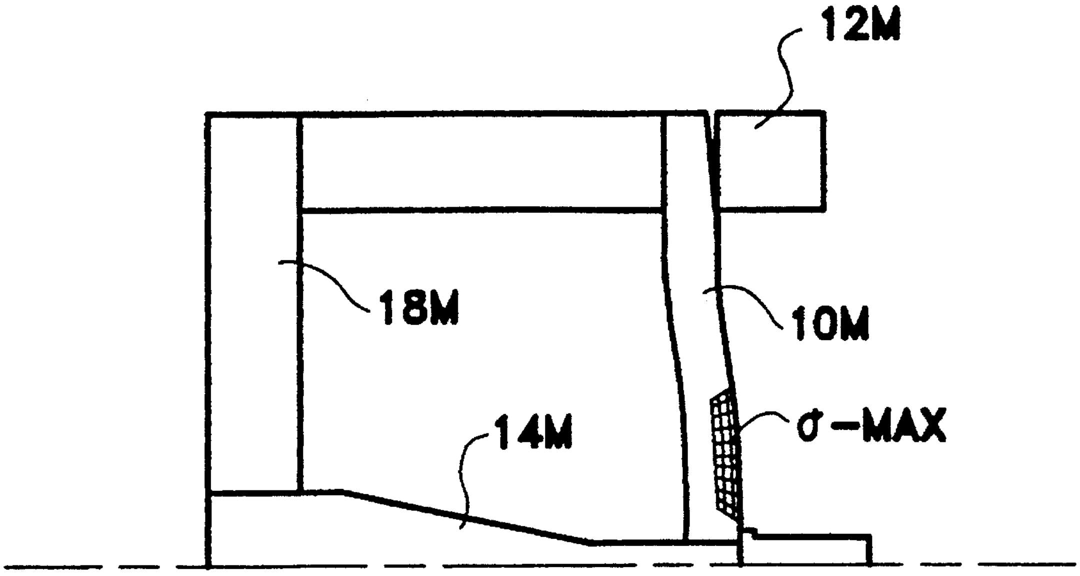
FIG. 3 is a schematic reproduction of a stress model of an extrusion die apparatus as shown in FIG. 1 and 2.

FIG. 3 of the drawing is a schematic illustration of a stress model of a die assembly incorporating a die with support rod in accordance with the invention as illustrated in FIGS. 1 and 2. In the model created for the analysis, segments 10M, 12M, 14M and 18M model the die 10, cartridge 12, support rod 14 and baffle plate 18, respectively, in FIGS. 1 and 2. For purposes of stress analysis, only one-half of the axially symmetric die assembly of FIGS. 1 and 2 needs to be considered, and so that is all that is modeled and shown.

The region of maximum die stress in this design is region σ-max, which is located on the outlet face of die element 10M between the supports provided by elements 14M and 12M. Other parts of the structure are also under tensional stress, although not so identified or indicated in the drawing, but region σ-max is the region of maximum stress throughout the range of extrusion pressures expected to be encountered in this die.

In the course of analyzing the die, various die thicknesses were evaluated to determine die plate thickness effects on maximum stress. Unexpectedly, a range of plate thicknesses was discovered wherein the maximum outlet face stress reached minimum values. Not surprising was the fact that thickness reductions caused higher stress; what had not previously been recognized was that, in a support rod die design, thickening the die in some thickness ranges will increase rather than decrease the maximum stress on the die. This effect is not present in conventional extrusion dies.

Without intending to be bound by theory, this finding may be explained as follows. In a support rod die of the type described, dies having thicknesses below the optimum range will, as expected, experience higher strain due to distortion of the die plate. This occurs even though center distortion is limited by the support, although the distortion observed in this type of die is toroidal rather than spherical. As expected, increasing die thickness, e.g., to a value in the optimum range, decreases this distortion and thus reduces the resulting stress.

As the thickness of the die plate increases above the optimum range, however, an unexpected increase, rather than a continuing decrease, in maximum die stress is seen. We presently attribute this to the fact that plate thickening does not significantly reduce plate bending in these dies at the extrusion pressures of current interest, since bending at these pressures is limited primarily by the rod support, rather than by the plate. With no substantial reduction in plate bending, thickening the plate actually generates higher stress in the maximum region, an effect confirmed by beam bending calculations. The net result is that the outlet face of the thicker plate sees a higher stress than that of a plate in the optimal range.

The existence and location of this local minimum in die outlet face stress level may be confirmed by calculations, using finite element stress analysis techniques familiar to the art. Alternatively, stress levels at any preselected extrusion pressure may be plotted for any die of a selected configuration and composition using measurements of strain as a function of die plate thickness.

Figure 4:
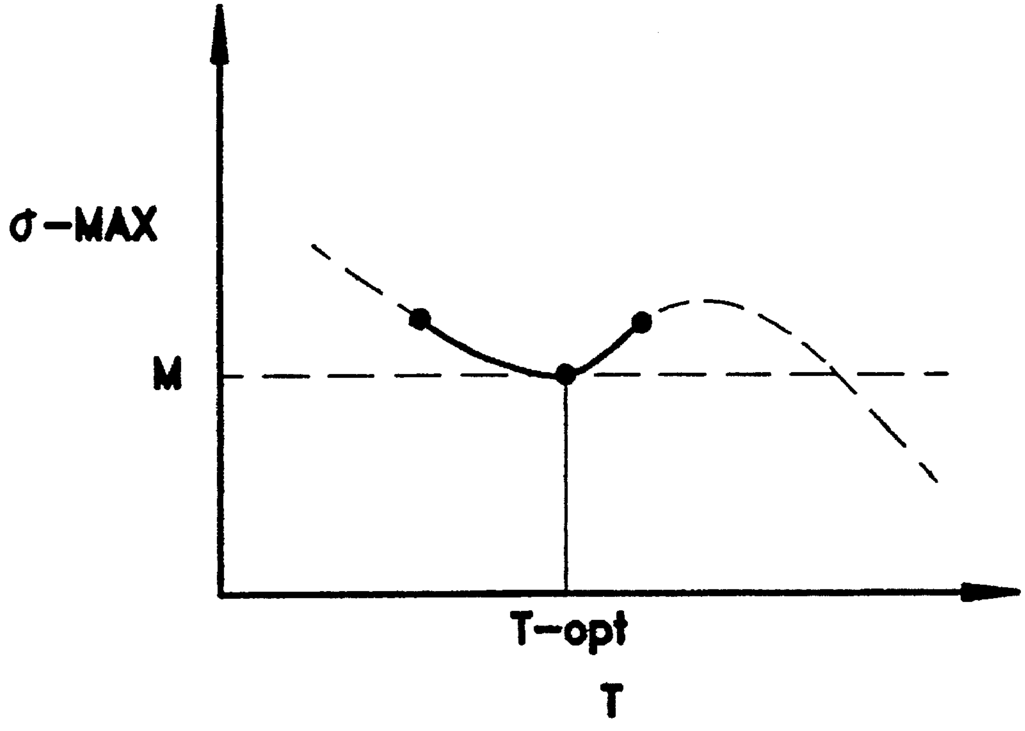
FIG. 4 is a plot of die thickness versus maximum outlet face stress for extrusion die apparatus such as shown in FIGS. 1 and 2.

FIG. 4 of the drawing illustrates the form of a stress-thickness plot which would be generated by evaluations the stress-thickness function σ-MAX(T) at a given constant extrusion pressure. In that plot, the stress value σ-MAX for a range of die thicknesses is plotted on the y-axis and die thickness T is plotted on the x-axis. Plot regions displayed as broken lines represent estimates or projections of die stress based on the foregoing theoretical considerations rather than on actual computed stress data.

As the plot indicates, maximum die stress σ-MAX decreases in proportion to die thickness as die thickness T increases from very low values (near the x-y origin of the graph). However, a minimum stress point is reached at an intermediate or optimum thickness point T-opt at σ-Max stress level M indicated by the horizontal broken line in FIG. 4, beyond which further increases in die thickness increase rather than decrease σ-MAX.

As the diagram also suggests, further stress reductions in the die are theoretically achievable at die thicknesses significantly above T-opt, but these die thicknesses have no practical utility. The reasons are twofold. First, the feedhole drilling technology which is available is not sufficiently advanced to form the necessary fine hole arrays in thick dies without excessive drill breakage and/or excessive hole "spearing" or misalignment. Secondly, the extrusion pressures needed to achieve reasonable extrusion rates in thick dies are excessive.

Based on the above considerations, the support rod die of the invention will generally have a plate thickness close to the value, on the plot of increasing die thickness versus decreasing maximum stress level, where maximum die stress reaches the first local minimum for the die configuration and extrusion pressure selected. By the first local minimum is meant the first stress minimum observed in the maximum stress function of die thickness σ-MAX(T) as die thickness increases to finite values from zero. Preferably, die thicknesses employed in the invention will be within ±25%, most preferably within ±10%, of the thickness T-opt at which the first local stress minimum in this function is observed.

In the case of a specific die design, to be fabricated of stainless steel of elastic modulus $30\times10^6$ psi, finite element stress analysis of a 30 cm (12 inch)-diameter support rod die model with a 2.22 cm (⅞ inches) support rod at a selected extrusion pressure of 1800 psi revealed a first minimum in the value of the maximum outlet face stress (σ-max) at a die thickness of about 2.7 cm (1.0625 inches). Maximum stress at this die thickness was only about 16 ksi. Maximum stress increased to about 18.5 ksi as die thickness was reduced to 2.54 cm ( 1.00 inches) and increased to 19.5 ksi as die thickness was increased to 2.845 cm (1.12) inches.

The drilling and slotting of support rod extrusion dies to be provided in accordance with the invention can be accomplished using conventional mechanical or electrochemical machining techniques. The method of choice for providing feed holes in the inlet face of the die plate is gun drilling. This technique permits the production of a large number of closely spaced holes at hole diameters in the 1 mm (0.040 inches) range, so that a feedhole pattern of the required density for supplying a fine discharge slot array can be provided.

Preferably, the discharge slots on the outlet face of the die are formed by the process of electrical discharge machining (EDM). This process is capable of producing discharge slots at slot widths in the 0.005 inch range, such widths being advantageous for the production of the very small wall thicknesses desired for heat regenerator applications. EDM also permits the easy formation of long slots, which are needed for the extrusion of large frontal area honeycombs such as herein described.

Any conventional slot pattern can be used for the fabrication of extrusion dies in accordance with the invention, but the preferred slot pattern for this use is of a type referred to in the art as a "compound slot" pattern. This pattern, described for example in U.S. Pat. No. 4,902,216, includes two superimposed arrays of slots. The first group of slots, referred to as primary slots, is configured in the manner of conventional criss-crossing discharge slots, in that every other slot intersection in the array is supplied with batch material from a single dedicated feedhole. The second group of slots comprises slots crossing the slots of the first group, but which are typically slightly wider and shallower than the slots of the first group. Slots of the second group, termed secondary slots, are supplied with batch material not by feedholes, but by batch material from slots of the first group. The advantage of the compound slot die design is that it permits the extrusion of high cell density substrate honeycombs without the need for providing feed holes at every slot intersection.

The invention may be further understood by reference to the following detailed example of the construction and use of an extrusion die in accordance therewith.

EXAMPLE

An extrusion die for the extrusion of a circular honeycomb body approximately 30 cm (12 inches) in diameter, 2.70 cm (1.0625 inches) in thickness, and having approximately 988 rectangular cells per square inch of open frontal area is fabricated. The die is formed from a steel die blank consisting of a plate of AISI Type 422 stainless steel having a thickness of 2.70 cm (1.0625 inches), this steel when hardened and tempered having a yield strength of about 760 MPa (110 ksi), an ultimate tensile strength of about 960 MPa (140 ksi), and an elongation at failure of about 13%.

The die blank is first subjected to gun drilling to form an array of feed holes into one face of the blank. The feed holes are approximately 1 mm (0.040 inches) in diameter, about 2.494 cm (0.982 inches) in depth, and are drilled at all intersections of a square grid array about 0.163 cm (0.064 inches) on a side projected on the inlet face of the die. Following the completion of the drilling step, the drilled die plate is soaked and washed in a detergent solution to completely remove all gun drilling oil from the drilled feed holes.

The drilled plate is next subjected to a slotting process to form a discharge slot array on the plate surface opposite the feedhole array. The location of the feed holes is first carefully gauged to ensure proper feedhole-slot alignment, and then an array of primary and secondary discharge slots is machined into the die plate on the outlet surface thereof. The primary discharge slots are approximately 0.152 mm (0.006 inches) in width and 2.743 mm (0.108 inches) in depth, and are spaced 1.143 mm (0.045 inches) apart to form a criss-crossing square cell array with alternate slot intersections positioned over and opening into the previously drilled feedholes.

The secondary discharge slots are 0.178 mm (0.007 inches) in width, 1.778 mm (0.070 inches) in depth, 1.143 mm (0.045 inches) apart, and are machined in one direction only. That is, one secondary slot is positioned between each two primary slots crossing the die in the vertical direction, but no secondary slots are machined in the horizontal direction, so that a rectangular cell array is formed by the superimposed primary and secondary slots. No feedholes are crossed by the secondary slots.

A hole about 2.225 cm (0.876 inches) in diameter is next drilled parallel with the feedholes through the center of the face of the machined die. This hole is to accommodate a support rod for the die final die assembly. The die is then cut to round shape and final outer dimensions by wire electrical discharge machining.

The drilled and slotted die thus provided is next polished by passing a fluid polishing compound repeatedly through the feedhole and slot array. The compound used is abrasive medium 956-N-1 available from the Extrudehone Corporation of Erwin, Pa.

A support rod for the die is next provided. It consists of a round tapered rod fabricated of AISI Type 420 stainless steel, hardened and tempered to provide a yield strength of 215 ksi, an ultimate tensile strength of 250 ksi, and an elongation at failure of 8%. The rod is 22.225 mm (0.875 inches) in diameter at the end to be fastened to the die and 7.264 cm (2.68 inches) in diameter at the base end to be anchored upstream of the die.

The base end of the rod is drilled and tapped to accept 28 cap screws, these being provided for later anchoring of the base end to a support member. The end of the rod adapted to hold the die is threaded utilizing a round-bottomed thread design for high strength, and a steel nut approximately 2 inches in length and machined with a matching thread is provided as stop means for preventing die flexure in the extrusion direction under the extrusion pressure anticipated.

The support rod thus provided is fastened by means of the cap screws to a drilled steel baffle plate about 5 cm (2 inches) in thickness and the threaded end of the rod is passed through the die and fitted with a washer and the threaded nut. The baffle plate is provided across its entire surface with holes through which batch material to be extruded is fed to the inlet face of the die. Although drilled, this plate has sufficient thickness and stiffness to support the major proportion of the load expected to be exerted on the die and support rod during subsequent extrusion.

A steel die cartridge is loaded with the assembled die, support rod, and baffle plate, and the cartridge with assembled die components is bolted to the outlet port of a hydraulic ram extruder. A number of extrusion runs are then carried out after loading the extruder with extrudable ceramic batches.

The batches used for the runs of the example comprise mixtures of clay, talc and alumina together with water and appropriate binders and lubricants. These batches are of the type conventionally used for the extrusion of green ceramic honeycombs, being convertible to cordierite ceramic honeycombs by appropriate heat treatment of the dried honeycombs. Other ceramic batches may alternatively used, composed of other ceramic materials such as lithium aluminosilicates, other silicates, or other refractory ceramics.

For the cordierite batches of this example, water contents are targeted in the range of 34–35% by weight to achieve viscosities appropriate for extrusion through the die. The honeycombs are extruded from the die at extrusion pressures in the 1000–1600 psi range. At these pressures, the flow front from the face of the die is uniform at an extrusion rate of about 1.5 feet/minute, for the batches of lower viscosity and higher water content.

The extruded honeycombs thus provided are dried and fired on a schedule typical for large ceramic honeycombs of the composition employed. After firing, the cell dimensions of the extruded honeycombs are approximately 0.052 cm by 0.106 cm (0.0205 by 0.04179 inches) in size, yielding a cell count of 1166 cells/in$^2$ of honeycomb frontal area. The webs defining the cells are in the range of 0.015–0.017 cm (0.0058–0.0065 inches) in thickness. The diameter of the center holes formed by the support rod fastener washer in the extruded fired honeycombs is about 2.05 cm (0.806 inches). Outer diameter part deviations from circularity can be maintained at values not exceeding about 1%.

Of course, the foregoing examples and descriptions of the invention are intended to be illustrative rather than limiting, and it will be recognized by those skilled in this art that numerous variations and modifications of the methods and apparatus herein described may be resorted to within the scope of the appended claims.

We claim:

1. Die apparatus for the extrusion of a honeycomb structure which comprises:

an extrusion die having an inlet face provided with a multiplicity of feedholes for the input of batch material from an upstream direction and an outlet face provided with a multiplicity of discharge slots for the discharge of the batch material as a honeycomb in a downstream direction, at least one support rod connected to a center portion of the die and extending in the upstream direction from the inlet face, and support means positioned in the upstream direction from the inlet face and connecting with the support rod, whereby plate distortion of the die, and stress and strain on the die during honeycomb extrusion at a selected extrusion pressure, are reduced.

2. Die apparatus for the extrusion of a honeycomb structure which comprises:

an extrusion die having an inlet face provided with a multiplicity of feedholes for the input of batch material from an upstream direction, an outlet face provided with a multiplicity of discharge slots for the discharge of the batch material as a honeycomb in a downstream direction, and a thickness in the range of ±25% of die thickness at the first local minimum in the maximum stress function σ-MAX of die thickness T for the die;

at least one support rod connected to a center portion of the die and extending in the upstream direction from the inlet face, and support means positioned in the upstream direction from the inlet face and connecting with the support rod, whereby plate distortion of the die, and stress and strain on the die during honeycomb extrusion at a selected extrusion pressure, are reduced.

3. Die apparatus in accordance with claim 1 wherein the extrusion die, support rod, and support means are contained within a die cartridge.

4. Die apparatus in accordance with claim 3 wherein the support means comprises a bridging member attached to the die cartridge.

5. Die apparatus in accordance with claim 3 wherein the support means comprises a supporting plate contained within the die cartridge.

6. Die apparatus in accordance with claim 1 wherein the support means is a bridging member attached to an extruder barrel to which the die apparatus is attached.

7. Die apparatus in accordance with claim 1 wherein the die is composed of high strength stainless steel.

8. Die apparatus in accordance with claim 7 wherein the stainless steel is selected from the group consisting of ferritic, austenitic, martensitic and precipitation-hardenable stainless steels having yield strengths of at least 50,000 psi and elastic moduli of at least $28\times10^6$ psi.

9. Die apparatus in accordance with claim 2 wherein the die thickness is in the range of ±10% of die thickness at the first local minimum in the maximum stress function.

10. Die apparatus in accordance with claim 8 wherein the die has a thickness in the range of 0.75–1.25 inches.

11. A method of forming a honeycomb body from a plasticized batch material which comprises the step of:

extruding the batch material through a honeycomb extrusion die in a downstream direction, while applying a supporting force to a central portion of the die in an upstream direction, the supporting force being applied by a support rod connecting the central portion of die to support means located upstream of the die, whereby plate distortion of the die, and stress and strain on the die during honeycomb extrusion at a selected extrusion pressure, are reduced.

12. A method in accordance with claim 11 wherein the honeycomb body has a cell count of at least 800 cells/in$^2$ and a diameter in excess of 6 inches.

13. A method in accordance with claim 12 wherein the honeycomb body has a cell wall thickness below 0.007 inches.

14. A method in accordance with claim 12 wherein the batch material is extruded through the honeycomb extrusion die at an extrusion pressure not exceeding 2000 psi.

* * * * *